United States Patent
Gfroerer et al.

(10) Patent No.: US 11,958,215 B2
(45) Date of Patent: Apr. 16, 2024

(54) PELLETIZATION OF A PHOSPHITE POLYMER STABILIZER

(71) Applicant: BASF SE, Ludwigshafen (DE)

(72) Inventors: Thomas Georg Gfroerer, Kaisten (CH); Shyam Sundar Sathyanarayana, Ludwigshafen (DE); Yean Yik Geoerg, Ludwigshafen (DE); Florian Puch, Ludwigshafen (DE); Jennifer M. O'Sullivan, Florham Park, NJ (US); Heinz Herbst, Kaisten (CH)

(73) Assignee: BASF SE (DE)

( * ) Notice: Subject to any disclaimer, the term of this patent is extended or adjusted under 35 U.S.C. 154(b) by 40 days.

(21) Appl. No.: 17/642,055

(22) PCT Filed: Sep. 7, 2020

(86) PCT No.: PCT/EP2020/074965
§ 371 (c)(1),
(2) Date: Mar. 10, 2022

(87) PCT Pub. No.: WO2021/048061
PCT Pub. Date: Mar. 18, 2021

(65) Prior Publication Data
US 2023/0302686 A1 Sep. 28, 2023

(30) Foreign Application Priority Data

Sep. 11, 2019 (EP) .................................... 19196747

(51) Int. Cl.
*C08K 5/526* (2006.01)
*B29B 9/06* (2006.01)
(Continued)

(52) U.S. Cl.
CPC .................. *B29B 9/12* (2013.01); *B29B 9/06* (2013.01); *C08J 3/12* (2013.01); *C08K 5/526* (2013.01);
(Continued)

(58) Field of Classification Search
CPC ........ C08J 3/12; C08J 232/00–16; C08K 5/52
See application file for complete search history.

(56) References Cited

U.S. PATENT DOCUMENTS 4,080,134 A 3/1978 Klaeysen et al.
5,846,656 A 12/1998 Dunski
(Continued)

FOREIGN PATENT DOCUMENTS

EP 0152107 A2 2/1985
EP 0152107 A2 8/1985
(Continued)

OTHER PUBLICATIONS

International Search Report on International Application No. PCT/EP2020/074965 dated Nov. 16, 2020, 5 pages.
(Continued)

*Primary Examiner* — Alexandre F Ferre
(74) *Attorney, Agent, or Firm* — Faegre Drinker Biddle & Reath LLP

(57) ABSTRACT

The invention relates to a method for manufacturing a pellet in a pellet mill, which method comprises the steps of
(A) pressing a mixture for compaction by a roller through a nozzle to obtain a strand, and
(B) comminuting the strand to obtain the pellet,
wherein the mixture for compaction comprises
(i) 87 to 97 wt. % of a polymer stabilizer, which is tris(2,4-ditert-butylphenyl) phosphite (CAS-No. 31570-04-4), and
(ii) 3 to 13 wt. % of a processing aid, which is a propylene-ethylene copolymer and which possesses a melting enthalpy below 100 J/g at 101.32 kPa.
(Continued)

The pellet is useful for a dust-free handling of its polymer stabilizer at a manufacturing of the stabilized polymer. Furthermore, a method for stabilizing a polymer, which is a polyolefin, a polystyrene or a mixture thereof, is disclosed, which comprises the dosing of the pellet to the polymer.

21 Claims, 4 Drawing Sheets

(51) Int. Cl.
 *B29B 9/12* (2006.01)
 *C08J 3/12* (2006.01)
 *C08L 23/16* (2006.01)
 *B29K 23/00* (2006.01)
 *B29K 25/00* (2006.01)

(52) U.S. Cl.
 CPC .......... *C08L 23/16* (2013.01); *B29K 2023/16* (2013.01); *B29K 2025/06* (2013.01); *C08J 2323/16* (2013.01); *C08J 2325/06* (2013.01)

(56) References Cited

U.S. PATENT DOCUMENTS

| | | |
|---|---|---|
| 6,596,198 B1 | 7/2003 | Semen |
| 6,800,228 B1 | 10/2004 | Semen |
| 2016/0280951 A1 | 9/2016 | Drumright et al. |

FOREIGN PATENT DOCUMENTS

| | | |
|---|---|---|
| EP | 3072925 A1 | 9/2016 |
| JP | H06254845 A | 9/1994 |
| RU | 2295439 C2 | 3/2007 |
| WO | 2008033410 A1 | 9/2007 |
| WO | 2008033410 A1 | 3/2008 |

OTHER PUBLICATIONS

International Preliminary Report on Patentability on International Application No. PCT/EP2020/074965 dated Mar. 15, 2022, 8 pages.

European Search Report for EP Patent Application No. 19196747.0, dated Mar. 19, 2020, 4 pages.

Wilfried Rahse, "Produktgestaltung über mechanisches Agglomerieren von Pulvern", Chemie Ingenieur Technik, vol. 87, Issue 7, 2015, pp. 881-902.

PELLETIZATION OF A PHOSPHITE POLYMER STABILIZER

The current invention relates to a method for manufacturing a pellet, which method comprises the steps of pressing a mixture for compaction, which comprises a polymer stabilizer, which is tris(2,4-ditert-butylphenyl) phosphite, and a processing aid, through a nozzle of a pellet mill to obtain a strand, and of comminuting the strands to obtain the pellet. A further embodiment is a pellet, which comprises the polymer stabilizer and the processing aid. A further embodiment is a use of the pellet for a dust-free handling of its components at a manufacturing of the stabilized polymer. A further embodiment is a method for manufacturing of a stabilized polymer, which comprises the step of incorporating the pellet into a polymer, which is a polyolefin, a polystyrene or a mixture thereof, to obtain the stabilized polymer. A further embodiment is a mixture for compaction.

An organic polymer, which is used as a constructive material to build or to be part of an article, is susceptible to degradation by oxidation, heat or light. There is a short-term degradation, which occurs at processing of the polymer, for example when the polymer obtained from the polymer synthesis is mechanically transformed into a desired final article or into an intermediate article. The intermediate article is often the product of a process, which serves to incorporate specifically desired additives into the polymer obtained from the polymer synthesis. The shorttime degradation is often characterized by a relatively short exposure to a relatively high process temperature, for example above 80° C. to 330° C., which occurs in many instances in combination with mechanical stress.

It is long known to incorporate a polymer stabilizer into an organic polymer for stabilization against degradation by oxidation, heat or light. The incorporation of the polymer stabilizer is typically done for a thermoplastic polymer during processing of the polymer, where the heated polymer possesses a reduced viscosity or is close to a liquid state and thus a homogenous distribution of the polymer stabilizer in the polymer is supported. A polymer stabilizer is very often solid at room temperature and obtained from its synthesis in the form of a powder. Practical problems arise at the actual incorporation of a polymer stabilizer in powder form. Handling of a powder is prone to an easy generation of dust. Dust is critical from an occupational health perspective for workers at a manufacturing plant, from a plant safety perspective, e.g. a dust explosion, and from a plant cleanness perspective, e.g. a dust soiling of the plant equipment. Furthermore, the incorporation of the powder into a polymer is typically not conducted in a batch-wise manner. Instead, a continuous dosing of a powder to a polymer, which is processed in a continuous way for example in an extruder, in an amount which is typically below 0.5% by weight of the polymer is prone to fluctuations of the really incorporated amount in a specific moment of time. Hence, a large overall amount of polymer contains afterwards statistically the same amount of polymer stabilizer, but this not necessarily true for single units out of the overall amount of polymer.

Several approaches are known for providing a suitable dust-free dosage form of a polymer stabilizer. One direction is to provide a suitable dust-free dosage form without adding a further ingredient, i.e. an ingredient is not needed as polymer stabilizer. For example, the polymer stabilizer in powder form is press-agglomerated via a roll compaction to obtain flakes. Another approach is the formation of pastilles from the polymer stabilizer in powder form by melting the mentioned one and let single drops of the melt solidify on a cooled surface. Another approach is the formation of pellets from the polymer stabilizer in powder form by heating and kneading the mentioned one in an extruder at a temperature above the softening point of the polymer stabilizer, extruding the heated mass through a die to form a warm strand and cutting the warm strand into pellets. Another direction is to provide a suitable dust-free dosage form by adding a further ingredient, i.e. an ingredient which is not needed as polymer stabilizer. The further ingredient, sometimes called compaction aid, binder or processing aid, in case of a polymeric further ingredient also masterbatch polymer or carrier polymer, acts typically as a type of hot-melt glue for the polymer stabilizer powder respectively its particles. Whether the polymer stabilizer itself melts to at least a major part depends on the applied temperature and the chemical nature of the further ingredient in relation to the polymer stabilizer, particularly whether a type of mutual solubility exists. An addition of a further ingredient in the dosage form of the polymer stabilizer has advantages. Particularly, a dosage form of a polymer stabilizer might be obtained initially dust-free simply by sieving respectively screening dust at the end of its manufacturing. However, attrition resistance of an initially dust-free dosage form is a property, which gets relevant in view of transport of the dosage form and associated formation of dust.

Tris(2,4-ditert-butylphenyl) phosphite (CAS-No. 31570-04-4) is a polymer stabilizer, which functions as a short-term processing stabilizer. It has a melting range of 180-183 ° C. and is for example contained in Irgafos 168 (TM, commercially available from BASF SE).

JP H06-254845 relates to a stabilizer with anti-powdering properties and dispersibility by a method wherein after a powder of a heat stabilizer and a powder of an organic compounding agent with a lower melting point or softening point than that of the heat stabilizer are mixed at a specified ratio, the mixture is fed into a ring grating plate and is extruded into a granular shape from the grating plate by means of a rotating roller.

U.S. Pat. No. 5,846,656 relates to a stabilizing system for stabilizing polymeric materials against ultraviolet light and thermooxidative deterioration, in which the stabilizing system is in pellet form. The pellet is formed from a substantially dry homogeneous mixture of at least one stabilizer and an agent which will prevent melting of the stabilizer. The stabilizer compound makes up about 50% to about 98% by weight of the mixture. The stabilizers are antioxidants such as phosphites and hindered phenols or hindered amine UV light stabilizers, or combinations thereof. The melt preventing agent may be a compound derived from a fatty acid or a fatty alcohol, or a fatty acid or a fatty alcohol, or a combination of fatty acids or fatty alcohols which makes up about 3% to 10% of the homogeneous mixture. The fatty acids, fatty alcohols, and the compounds derived therefrom preferably have a low melting point in the range of 50 to 100° C. and preferably between 50 to about 80° C. The melt preventing agent may alternatively be a lubricating agent having a small particle size, which makes up about 2 to 50% by weight of the homogeneous mixture.

U.S. Pat. No. 6,596,198 relates to a pelleted stabilizer additive system and a method of making same with a good pellet yield, preferably at least about 90 wt. %. The stabilizer additive system comprises at least a stabilizer and a processing aid, preferably a mold release agent. The processing aid has a lower melting temperature than the stabilizer. The stabilizer comprises less than 50 wt. % the combined total weight of the stabilizer and the mold release agent.

WO 2008-033410 relates to high concentration pelletized additive concentration or polymer stabilization agent or blends and their preparations, which can be used in various polymerization processes to enhance stability. The pelletized additive concentrates comprise at least 10 wt. % of a carrier polymer and are obtained in the examples by heating the additive mixtures together with the carrier polymer in an extruder above the melting temperature of the carrier polymer but lower than the melting temperature of the main additive, which is followed by cutting the warm strands into pellets. Example 4 results in pellets with a content of 48 wt. % tris(2,4-ditert-butylphenyl) phosphite at a pellet with an overall polymer stabilizer content of 70 wt. % and a content of polyethylene as a carrier polymer of 30 wt. %.

There is still a need for further solid dosage forms of a polymer stabilizer, which is tris(2,4-ditert-butylphenyl) phosphite, being originally in the form of powders as starting material. In a first aspect, the manufacturing of a dosage form respectively of the dosage form units should ideally occur without warming of the polymer stabilizers or at least minimize it. First, this saves process energy, which would be necessary for warming of the polymer stabilizer either by direct heating or by indirect heating, i.e. mechanical stress is transformed into thermal energy, which results in a clear increase of the temperature of the processed polymer stabilizer. Secondly, this also avoids an unnecessary exposure of the polymer stabilizer to an increased temperature. While an unnecessary exposure is in general to be avoided, an individual polymer stabilizer might also undergo a phase change, e.g. an originally crystalline material is transferred into a viscous state. Furthermore, the manufacturing of a dosage form should occur without generation of deficient product, i.e. the employed starting material of the polymer stabilizer should be processed in a high percentage into the dosage form in one run. In other words, an amount of generated rejects should be low, even if the rejects are in a form that they can be re-employed directly as a starting material again. An example for removing rejects is a sieving of the desired dosage form to obtain an initially dust-free dosage form. In a second aspect, a dosage form of a polymer stabilizer should after its manufacturing stay stable during storage and transport. Particularly, an initially dust-free dosage form might again generate dust respectively fines by attrition of the dosage form units versus each other at exposure to vibrations, for example during filling into a bag, at a transportation of the filled bag or at feeding operations of the dosage form units for incorporation into a polymer to be stabilized. Accordingly, a certain level of attrition resistance of the dosage form is desirable. In a third aspect, the units of a dosage form should ideally not be too diverse in its shape and weight, since this allows a more accurate feeding of the dosage form units at the incorporation into a polymer to be stabilized. A consequence of a more accurate feeding is especially at a continuous dosage into a polymer to be stabilized that the concentrations of the polymer stabilizer is less fluctuating in the stabilized polymer. In other words, the local concentration of polymer stabilizer at a certain part of the stabilized polymer shows less deviation from an average concentration of the polymer stabilizer in the whole stabilized polymer. If the feeding of the dosage form units occurs at the incorporation into the polymer to be stabilized at a stage, where the polymer is itself still present as solid units, e.g. pellets, then it is advantageous that the dosage form units are relatively similar in shape and weight to the solid units of the polymer. This disfavors that a mixture of the dosage form units and the solid units of the polymer to be stabilized segregate while being transported as a mixture. An example for such a transport is a pneumatic transport of a mixture of a polymer to be stabilized and the polymer stabilizer from a storage facility to the equipment for the incorporation into the polymer, e.g. an extruder. In a fourth aspect, the dosage form of the polymer stabilizer should contain a low content of an auxiliary ingredient. The auxiliary ingredient might be present only during a manufacturing of the dosage form, e.g. addition of a solvent, which is afterwards removed. The auxiliary ingredient might be present permanently, i.e. the composition of the dosage form contains an auxiliary ingredient, which will be incorporated into the polymer to be stabilized. In a fifth aspect, a stabilization of a polymer is supported by an ideally homogenous distribution of individual polymer stabilizer molecules throughout the polymer to be stabilized. Or in case that a polymer stabilizer is not soluble as an individual molecule in the polymer to be stabilized, aggregates of individual molecules of the insoluble polymer stabilizer or even larger particles out of aggregates of individual polymer stabilizer molecules are distributed homogenously in the polymer to be stabilized. The potential influence of a dosage form for a distribution of a polymer stabilizer is obvious by considering that at the beginning, all polymer stabilizer molecules are concentrated in the dosage form, whereas afterwards all polymer stabilizer molecules are ideally homogenously distributed in the polymer to be stabilized. An inhomogeneous distribution of a polymer stabilizer in the polymer to be stabilized might also get noticed differently to a decreased stability against degradation of the stabilized polymer in comparison to a polymer stabilized by a more perfect initial distribution like in case of mixing powders of polymer and polymer stabilizers. For example, an unevenly distributed polymer stabilizer in the stabilized polymer might disturb surface properties in case a thin polymer film manufacturing from the stabilized polymer or might lead to clogging of filters or nozzles in case a spin-extrusion of the stabilized polymer. The nature of the polymer to be stabilized interacts with a suitable polymer stabilizer. For example, a polyamide turns on its way to a molten state into a type of solvent comparable to dimethylsulfoxide, whereas a polyolefin typically turns on its way to a molten state only into a type of solvent like n-hexane or decaline. Hence, there is less potential for correction of the distribution of the polymer stabilizers in a polyolefin during its processing at a high temperature than in polyamide.

It has now been found a method for manufacturing a pellet in a pellet mill, which comprises a roller and a die with a nozzle, which method comprises the steps of
 (A) pressing a mixture for compaction by the roller through the nozzle to obtain a strand, and
 (B) comminuting the strand to obtain the pellet,
 wherein the mixture for compaction comprises
  (i) 87 to 97 wt. % of a polymer stabilizer, which is tris(2,4-ditert-butylphenyl) phosphite (CAS-No. 31570-04-4),
  (ii) 3 to 13 wt. % of a processing aid, which is a propylene-ethylene copolymer and which possesses a melting enthalpy below 100 J/g at 101.32 kPa,
  and wt. % is based on the weight of the mixture for compaction.

The weight percentages of the components (i) and (ii) of the mixture for compaction are based on the weight of the mixture for compaction. Accordingly, the weight percentages of all components contained in the mixture for compaction, which includes the components (i) and (ii), summarizes to overall 100 wt. %. In other words, the sum of all components is 100 wt. %. The sum of components (i) and (ii) is below or equal to 100 wt. %.

A polymer stabilizer serves to stabilize a polymer susceptible to oxidative, thermal or light-induced degradation against degradation by oxidation, heat or light. Tris(2,4-ditert-butylphenyl) phosphite (CAS-No. 31570-04-4) is depicted below

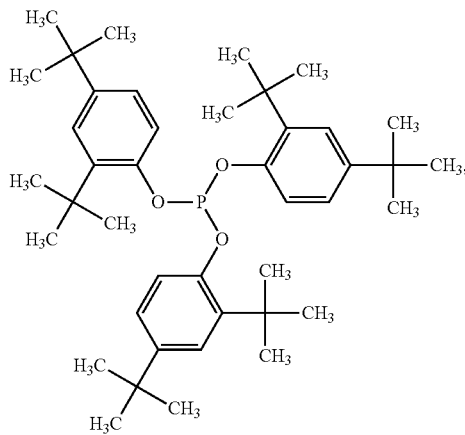 [SMILES: CC(C)(C)c1ccc(OP(Oc2ccc(C(C)(C)C)cc2C(C)(C)C)Oc2ccc(C(C)(C)C)cc2C(C)(C)C)c(C(C)(C)C)c1]

and contained for example in the commercial polymer stabilizer Irgafos 168 (TM BASF). It functions mainly as a short-term processing stabilizer. A short-term processing stabilizer is employed against a short-time degradation, which is often characterized by a relatively short exposure of a polymer to a relatively high process temperature, for example above 80° C. to 330° C., which occurs in many instances in combination with mechanical stress.

Preferably, the polymer stabilizer is in the form of a powder. A bulk density of the powder is determined complying to DIN EN ISO 17892-3. Preferably, the polymer stabilizer is in the form of a powder and has a bulk density above 300 g/L and below 900 g/L as determined by DIN EN ISO 17892-3, very preferably above 350 g/L and below 600 g/L, particularly above 380 g/L and below 550 g/L and very particularly above 400 g/L and below 500 g/L.

The processing aid possesses a melting enthalpy below 100 J/g at 101.32 kPa, a melting peak temperature and a melting range. The melting enthalpy is determined by a differential scanning calorimetry (DSC) according to EN ISO 11357-3, preferably at atmospheric pressure, e.g. 101.32 kPa. The melting temperature and the melting range are also determined by the differential scanning calorimetry according to EN ISO 11357-3 preferably at atmospheric pressure, e.g. 101.32 kPa. Preferably, the EN ISO 11357-3 at atmospheric pressure is conducted with three consecutive heating cycles with (a) 0° C. to 200° C. at 10° C./min and 30 mL/min $N_2$, (b) 200° C. to 0° C. at 10° C./min and 30 mL/min $N_2$, (c) 0° C. to 200° C. at 10° C./min and 30 mL/min $N_2$.

Preferably, the melting enthalpy of the processing aid is above 10 J/g and below 100 J/g at 101.32 kPa, very preferably above 15 J/g and below 85 J/g, particularly above 17 J/g and below 70 J/g, very particularly above 18 J/g and below 55 J/g, especially above 19 J/g and below 40 J/g, very especially above 20 J/g and below 30 J/g and most especially above 21 J/g and below 25 J/g.

Preferably, the melting peak temperature of the processing aid is above 50° C. and below 85° C., very preferably above 55° C. and below 83° C., particularly above 60° C. and below 81° C., very particularly above 65° C. and below 80° C., especially above 70° C. and below 79° C., very especially above 73° C. and below 78° C. and most especially above 75° C. and below 77° C.

Preferably, the melting range of the processing aid is between 20° C. and 100° C., very preferably between 21° C. and 99° C., particularly between 22° C. and 98° C., very particularly between 23° C. and 97° C. and especially between 24° C. and 96° C.

Preferred is a method for manufacturing a pellet, wherein the processing aid possesses a melting peak temperature above 50° C. and below 85° C.

The processing aid, which is a propylene-ethylene copolymer, has a weight average molecular weight (Mw), a number average molecular weight (Mn) and a polydispersity index (PD), which is the ratio between Mw and Mn. Preferably, the weight average molecular weight, the number average molecular weight and the polydispersity index are determined by gel permeation chromatography (GPC), very preferably by a high temperature gel permeation chromatography (HTGPC) according to ISO 16014-4. At the gel permeation chromatography, a detector is preferably a refractive index detector (RI detector). A solvent is preferably trichlorobenzene. A column temperature is preferably 150° C. A calibration standard comprises preferably a polystyrene.

Preferably, the weight average molecular weight of the processing aid, which is a propylene-ethylene copolymer, is above 10000 Da (Dalton) and below 40000 Da, very preferably above 12000 Da and below 35000 Da, particularly above 14000 Da and below 30000 Da, very particularly above 15000 Da and below 25000 Da, especially above 16000 Da and below 20000 Da and very especially above 17000 Da and below 18000 Da.

Preferably, the number average molecular weight of the processing aid, which is a propyleneethylene copolymer, is above 2000 Da and below 10000 Da, very preferably above 3000 Da and below 9000 Da, particularly above 4000 Da and below 8000 Da, very particularly above 5000 Da and below 7500 Da and especially above 6000 Da and below 7000 Da.

Preferably, the polydispersity index of the processing aid, which is a propylene-ethylene copolymer, is above 1.3 and below 7, very preferably above 1.5 and below 5, particularly above 1.7 and below 4, very particularly above 1.9 and below 3.5, especially above 2.1 and below 3 and very especially above 2.3 and below 2.7.

Preferably, the weight average molecular weight of the processing aid, which is a propylene-ethylene copolymer, is above 10000 Da and below 40000 Da and the number average molecular weight is above 2000 Da and below 10000 Da, very preferably the weight average molecular weight is above 12000 Da and below 35000 Da and the number average molecular weight is above 3000 Da and below 9000 Da, particularly the weight average molecular weight is above 14000 Da and below 30000 Da and the number average molecular weight is above 4000 Da and below 8000 Da, very particularly the weight average molecular weight is above 15000 Da and below 25000 Da and the number average molecular weight is above 5000 Da and below 7500 Da, especially the weight average molecular weight is above 16000 Da and below 20000 Da and the number average molecular weight is above 6000 Da and below 7000 Da.

Preferably, the polydispersity index of the processing aid, which is a propylene-ethylene copolymer, is above 1.3 and below 7 and the weight average molecular weight is above 10000 Da (Dalton) and below 40000 Da, very preferably the polydispersity index is above 1.5 and below 5 and the weight average molecular weight is above 12000 Da and below 35000 Da, particularly the polydispersity index is above 1.7 and below 4 and the weight average molecular weight is above 14000 Da and below 30000 Da, very particularly the polydispersity index is above 1.9 and below 3.5 and the average molecular weight is above 15000 Da and below 25000 Da, especially the polydispersity index is above 2.1 and below 3 and the average molecular weight is above 16000 Da and below 20000 Da and very especially the polydispersity index is above 2.3 and below 2.7 and the average molecular weight is above 17000 Da and below 18000 Da.

It is understood that the polydispersity index correlates mathematically to the weight average molecular weight and the number average molecular weight. Hence in the following, the provided range for the polydispersity index means that only those specific polydispersity indices are intended, which can be achieved by choosing a suitable specific average molecular weight out of the provided range for the average molecular weight and by choosing a suitable specific number average molecular weight out of the provided range for the number average molecular weight. Preferably, the polydispersity index of the processing aid, which is a propylene-ethylene copolymer, is above 1.3 and below 7, the weight average molecular weight is above 10000 Da (Dalton) and below 40000 Da and the number average molecular weight is above 2000 Da and below 10000 Da. Very preferably, the polydispersity index is above 1.5 and below 5, the weight average molecular weight is above 12000 Da and below 35000 Da and the number average weight is above 3000 Da and below 9000 Da. Particularly, the polydispersity index is above 1.7 and below 4, the weight average molecular weight is above 14000 Da and below 30000 Da and the number average weight is above 4000 Da and below 8000 Da. Very particularly, the polydispersity index is above 1.9 and below 3.5, the average molecular weight is above 15000 Da and below 25000 Da and the number average molecular weight is above 5000 Da and below 7500 Da. Especially, the polydispersity index is above 2.1 and below 3, the average molecular weight is above 16000 Da and below 20000 Da and the number average molecular weight is above 6000 Da and below 7000 Da.

Preferred is a method for manufacturing a pellet, wherein the processing aid possesses a weight average molecular weight above 10000 Da and below 40000 Da.

Preferably, the processing aid is in the form of a powder. A bulk density of the powder is determined complying to DIN EN ISO 17892-3. Preferably, the processing aid is in the form of a powder and has a bulk density above 200 g/L and below 800 g/L as determined by DIN EN ISO 17892-3, very preferably above 250 g/L and below 600 g/L, particularly above 280 g/L and below 400 g/L and very particularly above 300 g/L and below 400 g/L.

Preferably, the processing aid is a propylene-ethylene copolymer, which is a wax. Preferably, the processing aid is a propylene-ethylene copolymer wax, which is synthesized with a metallocene catalyst from propylene and ethylene. Preferably, the processing aid is a propylene-ethylene copolymer, which is long polymer chains are branched by short chains (—CH$_3$), very preferably branched essentially only be short chains and particularly branched only by short chains. Preferably, the processing aid is a propylene-ethylene copolymer wax, which has a density at 23° C. according to ISO 1183 above 0.85 g/cm$^3$ and below 0.90 g/cm$^3$, very preferably 0.87 g/cm$^3$. Preferably, the processing aid is a propylene-ethylene copolymer wax, which has a drop point according to ASTM D 3954 above 80° C. and below 100° C., very preferably above 85° C. and below 95° C. and particularly, the drop point is in a range between 87° C. and 93° C. Preferably, the processing aid is a propylene-ethylene copolymer wax, which has a viscosity at 170° C. according to DIN 53019 above 50 mPas and below 750 mPas, very preferably above 100 mPas and below 500 mPas, particularly above 120 mPas and 350 mPas and very particularly, the viscosity is in a range between 150 mPas and 250 mPas. Preferably, the processing aid is a propylene-ethylene copolymer wax, which is Licocene PP 1302.

Preferred is a method for manufacturing a pellet, wherein the processing aid is a propylene-ethylene copolymer, which is a wax.

Preferred is a method for manufacturing a pellet, wherein the mixture for compaction comprises
(i) 88 to 97 wt. % of the polymer stabilizer, and
(ii) 3 to 12 wt. % of the processing aid.

Preferred is a method for manufacturing a pellet, wherein the mixture for compaction comprises
(i) 90 to 97 wt. % of the polymer stabilizer, and
(ii) 3 to 10 wt. % of the processing aid.

Preferred is a method for manufacturing a pellet, wherein the mixture for compaction comprises
(i) 91 to 97 wt. % of the polymer stabilizer, and
(ii) 3 to 9 wt. % of the processing aid.

Preferred is a method for manufacturing a pellet, wherein the mixture for compaction comprises
(i) 89 to 96 wt. % of the polymer stabilizer, and
(ii) 4 to 11 wt. % of the processing aid.

Preferred is a method for manufacturing a pellet, wherein the mixture for compaction comprises
(i) 90 to 96 wt. % of the polymer stabilizer, and
(ii) 4 to 10 wt. % of the processing aid.

Preferred is a method for manufacturing a pellet, wherein the mixture for compaction comprises
(i) 91 to 96 wt. % of the polymer stabilizer, and
(ii) 4 to 9 wt. % of the processing aid.

Preferred is a method for manufacturing a pellet, wherein the mixture for compaction comprises
(i) 87 to 94 wt. % of the polymer stabilizer, and
(ii) 6 to 13 wt. % of the processing aid.

Preferred is a method for manufacturing a pellet, wherein the mixture for compaction comprises
(i) 88 to 94 wt. % of the polymer stabilizer, and
(ii) 6 to 12 wt. % of the processing aid.

Preferred is a method for manufacturing a pellet, wherein the mixture for compaction comprises
(i) 87 to 93 wt. % of the polymer stabilizer, and
(ii) 7 to 13 wt. % of the processing aid.

Preferred is a method for manufacturing a pellet, wherein the mixture for compaction comprises
(i) 88 to 93 wt. % of the polymer stabilizer, and
(ii) 7 to 12 wt. % of the processing aid.

In case a further ingredient, which is different to the polymer and to the processing aid, is contained in the mixture of compaction, then the further ingredient is only contained in a relatively small amount, i.e. up to 10 wt. % (=0 to 10 wt. %). A further ingredient comprises also a mixture of further ingredients. Accordingly, the mixture of further ingredients is only contained in a relatively small amount, i.e. up to 10 wt. % (=0 to 10 wt. %). A further ingredient is for example another polymer stabilizer, another processing aid or a filler. Another polymer stabilizer is for example a phenolic antioxidant, an UV absorber, a hindered amine light stabilizer, a metal deactivator, a phosphite, which is different to the polymer stabilizer, a phosphonite, a hydroxylamine or amine N-oxide, a thiosynergist, an acid scavenger or a peroxide scavenger. Another processing aid is for example an oleamide, erucamide, behenamide or glyceryl monostearate. A filler is for example silica, talc or wollastonite. Preferably, the further ingredient has a light absorption maximum at a wavelength below 380 nm, very preferably below 350 nm, particularly below 300 nm, very particularly below 280 nm, especially below 260 nm and very especially no light absorption maximum above 250 nm.

The further ingredient is preferably in the solid form at 23° C. and 101.32 KPa. Preferably, the further ingredient is in the form of a powder. A bulk density of the powder is determined complying to DIN EN ISO 17892-3. Very preferably, the further ingredient is in the form of a powder and has a bulk density above 200 g/L and below 950 g/L.

Preferably, the further ingredient is contained the mixture for compaction in an amount of up to 9 w. % (=0 to 9 wt. %.), very preferably in an amount of up to 8 wt. % (=0 to 8 wt. %), particularly in an amount of up to 7 wt. % (=0 to 7 wt. %), very particularly in an amount of up to 6 wt. % (=0 to 6 wt. %), especially in an amount of up to 5 wt. % (=0 to 5 wt. %), very especially in an amount of up to 3 wt. % (=0 to 3 wt. %), most especially in an amount of up to 1 wt. % (=0 to 1 wt. %) and very most especially, no further ingredient is contained in the mixture for compaction.

Preferred is a method for manufacturing a pellet in a pellet mill, which comprises a roller and a die with a nozzle, which method comprises the steps of
- (A) pressing a mixture for compaction by the roller through the nozzle to obtain a strand, and
- (B) comminuting the strand to obtain the pellet,
- wherein the mixture for compaction comprises
  - (i) 87 to 97 wt. % of a polymer stabilizer, which is tris(2,4-ditert-butylphenyl) phosphite (CAS-No. 31570-04-4),
  - (ii) 3 to 13 wt. % of a processing aid, which is a propylene-ethylene copolymer and which possesses a melting enthalpy below 100 J/g at 101.32 kPa, and
  - (iii) up to 10 wt. % of a further ingredient, which is different to component (i) and component (ii),
  - and the sum of components (i), (ii) and (iii) is below or equal to 100 wt. %.

Preferred is a method for manufacturing a pellet in a pellet mill, which comprises a roller and a die with a nozzle, which method comprises the steps of
- (A) pressing a mixture for compaction by the roller through the nozzle to obtain a strand, and
- (B) comminuting the strand to obtain the pellet,
- wherein the mixture for compaction consists of
  - (i) 87 to 97 wt. % of a polymer stabilizer, which is tris(2,4-ditert-butylphenyl) phosphite (CAS-No. 31570-04-4),
  - (ii) 3 to 13 wt. % of a processing aid, which is a propylene-ethylene copolymer and which possesses a melting enthalpy below 100 J/g at 101.32 kPa, and
  - (iii) 0 to 10 wt. % of a further ingredient, which is different to component (i) and component (ii),
  - and the sum of components (i), (ii) and (iii) is 100 wt. %.

Preferred is a method for manufacturing a pellet, wherein the mixture for compaction contains
- (iii) 0 to 3 wt. % of the further ingredient.

Preferred is a method for manufacturing a pellet, wherein the mixture for compaction consists of
- (i) 88 to 97 wt. % of the polymer stabilizer,
- (ii) 3 to 12 wt. % of the processing aid, and
- (iii) 0 to 9 wt. % of the further ingredient,
- and the sum of components (i), (ii) and (iii) is 100 wt. %.

Preferred is a method for manufacturing a pellet, wherein the mixture for compaction consists of
- (i) 90 to 97 wt. % of the polymer stabilizer,
- (ii) 3 to 10 wt. % of the processing aid, and
- (iii) 0 to 7 wt. % of the further ingredient,
- and the sum of components (i), (ii) and (iii) is 100 wt. %.

Preferred is a method for manufacturing a pellet, wherein the mixture for compaction consists of
- (i) 91 to 97 wt. % of the polymer stabilizer,
- (ii) 3 to 9 wt. % of the processing aid, and
- (iii) 0 to 6 wt. % of the further ingredient,
- and the sum of components (i), (ii) and (iii) is 100 wt. %.

Preferred is a method for manufacturing a pellet, wherein the mixture for compaction consists of
- (i) 89 to 96 wt. % of the polymer stabilizer,
- (ii) 4 to 11 wt. % of the processing aid, and
- (iii) 0 to 7 wt. % of the further ingredient,
- and the sum of components (i), (ii) and (iii) is 100 wt. %.

Preferred is a method for manufacturing a pellet, wherein the mixture for compaction consists of
- (i) 90 to 96 wt. % of the polymer stabilizer,
- (ii) 4 to 10 wt. % of the processing aid, and
- (iii) 0 to 6 wt. % of the further ingredient,
- and the sum of components (i), (ii) and (iii) is 100 wt. %.

Preferred is a method for manufacturing a pellet, wherein the mixture for compaction consists of
- (i) 91 to 96 wt. % of the polymer stabilizer,
- (ii) 4 to 9 wt. % of the processing aid, and
- (iii) 0 to 5 wt. % of the further ingredient,
- and the sum of components (i), (ii) and (iii) is 100 wt. %.

Preferred is a method for manufacturing a pellet, wherein the mixture for compaction consists of
- (i) 87 to 94 wt. % of the polymer stabilizer,
- (ii) 6 to 13 wt. % of the processing aid, and
- (iii) 0 to 7 wt. % of the further ingredient,
- and the sum of components (i), (ii) and (iii) is 100 wt. %.

Preferred is a method for manufacturing a pellet, wherein the mixture for compaction consists of
- (i) 88 to 94 wt. % of the polymer stabilizer,
- (ii) 6 to 12 wt. % of the processing aid, and
- (iii) 0 to 6 wt. % of the further ingredient,
- and the sum of components (i), (ii) and (iii) is 100 wt. %.

Preferred is a method for manufacturing a pellet, wherein the mixture for compaction consists of
- (i) 87 to 93 wt. % of the polymer stabilizer,
- (ii) 7 to 13 wt. % of the processing aid, and
- (iii) 0 to 6 wt. % of the further ingredient,
- and the sum of components (i), (ii) and (iii) is 100 wt. %.

Preferred is a method for manufacturing a pellet, wherein the mixture for compaction consists of
- (i) 88 to 93 wt. % of the polymer stabilizer,
- (ii) 7 to 12 wt. % of the processing aid, and
- (iii) 0 to 5 wt. % of the further ingredient,
- and the sum of components (i), (ii) and (iii) is 100 wt. %.

The mixture for compaction is preferably in the solid form at 23° C. and 101.32 KPa. Very preferably, the mixture for compaction is in the form of a powder. Preferably, the mixture for compaction in the form of a powder is obtained by a physical mixing of the polymer stabilizer in the form of a powder and the processing aid in the form of a powder and optionally the further ingredient in the form of a powder. The physical mixing is free of a complete melting of the polymer stabilizer or the processing aid and is free of dissolving the polymer stabilizer or the processing stabilizer in a solvent followed by evaporating of some or all of the solvent. The solid particles of the powders of components (i), (ii) and optionally (iii) are homogeneously distributed in the mixture for compaction. The physical mixing can be conducted in batches or continuously.

The mixture for compaction is the feed material in the method of manufacturing a pellet in a pellet mill. The mixture for compaction is typically continuously dosed to a section of the pellet mill comprising the die with the nozzle and the roller by gravity. If the temperature of the mixture for compaction at its dosing to the section of the pellet mill comprising the die with the nozzle and the roller is too high, a pasty mass forms at the roller area, which can lead to a failure of the method of manufacturing. The temperature of the mixture for compaction at dosing is preferably below 40° C., very preferably the dosing occurs at room temperature. The roller pre-compacts and degasses the feed material and presses the feed material through the nozzle. A cylindrical strand is formed. In more detail, the mixture for compaction as the feed material is further compacted in the feed zone of the nozzle, which can be cone-shaped, and begins to heat up and to sinter in a longish, typically cylindrically formed, channel of the nozzle by friction on the surface of the nozzle. The relevant surface of the nozzle is the surface of the channel, which is typically cylindrical, of the nozzle along the smallest diameter of the channel. The smallest diameter of the nozzle is herein defined as nozzle diameter. The press length is defined herein as the distance, where the smallest diameter of of the cylindric channel applies. The cylindric channel of the nozzle might expand after the press length, but the expanded part of the cylindric channel does not contribute for building up friction by the feed material. The nozzle diameter and the pressing length are parameters, which are influencing the degree of sintering. The comminuting of the strand to obtain pellets occurs for example with a cutting knife as a comminuting device in an adjusted distance from the outer side of the die. The cutting knife cuts respectively breaks the strand to pellets with a varying length of typically 1 to 3 times of the nozzle diameter. Subsequently, the pellets are cooled and can be sieved, for example with a 1.6 mm sieve, which is for example done in a vibrating sieve. The sieved fines fraction consisting essentially of the mixture for compaction in a partly compacted form might be reused directly again as feed material or reused after a grounding. A more detailed description is provided in the experimental part at section E). It is noted that two or more steps (A) can occur prior to step (B), i.e. two or more pressings occur prior to a comminuting of the formed strand. A parameter for this is the distance between the ending of the press length and the comminuting device, for example the cutting knife.

Prior to step (A), the mixture for compaction is fed into the section of the pellet mill, which com-prises the die with the nozzle and the roller. The mixture for compaction is preferably fed into the pellet mill in the form of a powder. This occurs preferably by gravity.

Preferred is a method for manufacturing a pellet, wherein the method comprises a step (pre-A) feeding the mixture for compaction into the pellet mill, wherein the mixture for compaction is in the form of a powder, and the step (pre-A) occurs before the step (A).

The formed strand has a surface temperature, which is increased after leaving the nozzle versus the surrounding temperature by the occurred friction. The surface temperature of the strand is determined for example by measurement of its infrared irradiation. Preferably, the surface temperature of the strand is above 50° C. and below 110° C., very preferably above 55° C. and below 105° C., particularly above 60° C. and below 103° C., very particularly above 62° C. and below 101° C.

Preferred is a method for manufacturing a pellet, wherein the strand has a surface temperature above 50° C. and below 110° C.

A pellet mill is preferably a ring die pellet mill or a flat die pellet mill. At a gear-type pellet mill, two gear wheels are acting as a roller and forming a nozzle and die equivalent by a spur-gearing situation between the gear-wheals, which leads to a compression and compaction of the mixture for compaction.

Preferred is a method for manufacturing a pellet, wherein the pellet mill is a ring die pellet mill, wherein the die has a geometric form of a ring with an inner side and an outer side and the nozzle represent a pass from the inner side to the outer side, or the pellet mill is a flat die pellet mill, wherein the die has a geometric form of a planar plate with an upper side and a lower side and the nozzle represents a pass from the upper side to the lower side.

Preferred is a method for manufacturing a pellet, wherein at the ring die pellet mill, the ring is rotating and the roller possesses a rotation axis, which is stationary, and at the flat die pellet mill, the die is stationary and the roller possesses a rotation axis, which is rotating.

The main factor for an amount of mechanical energy input is the ratio of the press length of a nozzle to the nozzle's nozzle diameter. For example, the surface temperature is influenced by a chosen press length of the nozzle and the nozzle diameter. Preferably, the ratio of the press length to the nozzle diameter is from 2 to 8, very preferably from 3 to 7, particularly from 4 to 6 and very particularly 5.

Preferred is a method for manufacturing a pellet, wherein the nozzle has a nozzle diameter and a press length, and a ratio of the press length to the nozzle diameter is from 2 to 8.

A roller, preferably two or more rollers, very preferably two or three rollers, are typically driven by friction between the roller, the mixture for compaction and the die. A smooth surface of the roller can lead to a slipping of the roller. A too high degree of slipping, which could lead to a failure of the method for manufacturing, is reduced by a corrugated surface of the roller.

Preferred is a method for manufacturing a pellet, wherein the roller surface is corrugated.

At the ring die pellet mill, another factor for an amount of mechanical energy input is the speed of the rotation of the ring die respectively its rotation frequency.

Preferred is a method for manufacturing a pellet, wherein the pellet mill is a ring die pellet mill.

The number of dies at a pellet mill is driven by its construction design and engineering considerations thereof. Preferably, the pellet mill comprises one die. The number of rollers at a pellet mill is driven by its construction design and engineering considerations thereof. A higher number of rollers allow that in case of a die having two or more nozzles, which are located opposite to each other at the die, the steps (A) and (B) can occur more often over a certain time period at the pellet mill. The pellet mill comprises preferably two or more rollers, very preferably two, three or four rollers, particularly two or three rollers and very particularly two rollers. The number of nozzles at a die is driven by its construction design and engineering considerations. A higher number of nozzles at a die enables that the step (A) is occurring at individual nozzles in parallel or afterwards, which leads to the formation of two or more strands in parallel. Afterwards means here that a step (A) occurs at another nozzle prior to that a step (A) is repeated at the initially first nozzle again. Step (B) occurs then in principle in parallel, i.e. comminuting of the two or more strands occurs in principle in parallel. Thus, two or more pellets are obtained in principle in parallel. Hence, the output of the number of pellets in a certain time period increases significantly. The die of the pellet mill comprises preferably two or more nozzles, very preferably 48 to 20000, particularly 96 to 16000, very particularly 360 to 14000, especially 720 to 12000, very especially 1440 to 11000 and most especially 3600 to 10000.

Preferred is a method for manufacturing a pellet, wherein the pellet mill comprises two rollers.

Preferred is a method for manufacturing a pellet, wherein the pellet mill comprises a ring with two or more nozzles.

Preferred is a method for manufacturing a pellet, wherein the pellet mill comprises one ring.

Preferred is a method for manufacturing a pellet, wherein the pellet mill comprises two or more rollers and the die comprises two or more nozzles.

Preferred is a method for manufacturing a pellet, wherein the pellet mill comprises one die, two or more rollers and the die comprises two or more nozzles.

Preferred is a method for manufacturing a pellet, wherein the pellet mill comprises one die, two or more rollers and the die comprises two or more nozzles and the step (A) occurs at a first one of the two or more nozzles and at the same time or afterwards at a second one of the two or more nozzles but before step (A) occurs again at the first one of the two or more nozzles.

The pellet obtainable from the method for compaction comprises
  (i) 87 to 97 wt. % of a polymer stabilizer, which is tris(2,4-ditert-butylphenyl) phosphite (CAS-No. 31570-04-4), and
  (ii) 3 to 13 wt. % of a processing aid, which is a propylene-ethylene copolymer possessing a melting enthalpy below 100 J/g at 101.32 kPa,
and wt. % is based on the weight of the pellet.

The weight percentages of the components (i) and (ii) of the pellet are based on the weight of the pellet. Accordingly, the weight percentages of all components contained in the pellet, which includes the components (i) and (ii), summarizes to overall 100 wt. %. In other words, the sum of all components is 100 wt. %. The sum of components (i) and (ii) is below or equal to 100 wt. %.

Preferably, the pellet comprises
  (i) 87 to 97 wt. % of a polymer stabilizer, which is tris(2,4-ditert-butylphenyl) phosphite (CAS-No. 31570-04-4),
  (ii) 3 to 13 wt. % of a processing aid, which is a propylene-ethylene copolymer possessing a melting enthalpy below 100 J/g at 101.32 kPa, and
  (iii) up to 10 wt. % of a further ingredient, which is different to component (i) and component (ii),
and the sum of components (i), (ii) and (iii) is below or equal to 100 wt. %.

Preferably, the pellet consists of
  (i) 87 to 97 wt. % of a polymer stabilizer, which is tris(2,4-ditert-butylphenyl) phosphite (CAS-No. 31570-04-4),
  (ii) 3 to 13 wt. % of a processing aid, which is a propylene-ethylene copolymer possessing a melting enthalpy below 100 J/g at 101.32 kPa, and
  (iii) 0 to 10 wt. % of a further ingredient, which is different to component (i) and component (ii),
and the sum of components (i), (ii) and (iii) is 100 wt. %.

The pellet has preferably a shape of a round rod. The shape of the round rod is idealized a cylinder, however the two base areas of the cylinder are in case of the pellet not always planar and parallel to each other, particularly not planar and parallel to each other. This is due to the comminuting the strand of the strand at step (B), which includes more elements of breaking than in case a strand, which is homogeneously warmed to a temperature above 110° C. is hot-cutted by a knife. The round rod has a diameter of a circle. Preferably, the round rod has a diameter of a circle, which is between 2 mm and 4 mm, very preferably 3 mm. A length of the pellet is herein understood as the longest distance in the direction of the strand formation in the nozzle, i.e. the axis of the pellet, which is defined by having in average the same distance to points of the pellet surface excluding those points at the surface of the pellet, which are generated through comminuting the strand. In case of a round rod, the axis of the pellet is the rotational axis of the round rod. A pellet has preferably a length of 1 to 3 times of the diameter of a circle. While one pellet has a specific length value itself, a plurality of pellets can have an average length of the pellets.

This is caused by step (B) occurring by cutting with elements of breaking. Beneath the distance of the comminuting device at step (B), the design of the nozzle and its nozzle channel plays a role. One option is that the press length of the nozzle is followed by a section with a diameter, which is larger than the diameter of the nozzle. Hence, the nozzle comprises a channel with a press length section and an expanded section, which follows after the press length section. The expanded section allows that a desired thickness of the die is larger than the press length of the nozzle. A certain thickness of the die might be desired for mechanical strength reasons of the die, for example to avoid a breaking of the die.

A possible step (C) is a sieving of the pellets from step (B), for example with a 1.6 mm sieve. This removes fines originating from the method of manufacturing a pellet, for example at its step (B).

A possible step (D) is a cooling of the pellets. For example, a cooling leads to a pellet temperature, which is similar to a temperature surrounding the pellet mill. The temperature surrounding the pellet mill is preferably room temperature, very preferably 23° C. This cooling might already partly or completely take place while conducting the possible step (C). A cooling can be supported by a flow of air.

The above described definitions and preferences for a method of manufacturing a pellet in a pellet mill, for the mixture for compaction and for the pellet are described for a method of manufacturing a pellet in a pellet mill. These definitions and preferences apply also to the further embodiments of the invention.

A further embodiment of the invention is a mixture for compaction, which comprises
  (i) 87 to 97 wt. % of a polymer stabilizer in the physical form of a powder, which is tris(2,4-ditert-butylphenyl) phosphite (CAS-No. 31570-04-4), and (ii) 3 to 13 wt. % of a processing aid in the physical form of a powder, which is a propylene-ethylene copolymer possessing a melting enthalpy below 100 J/g at 101.32 kPa, and wt. % is based on the weight of the mixture for compaction.

The weight percentages of the components (i) and (ii) of the mixture for compaction are based on the weight of the mixture for compaction. Accordingly, the weight percentages of all components contained in the mixture for compaction, which includes the components (i) and (ii), summarizes to overall 100 wt. %. In other words, the sum of all components is 100 wt. %. The sum of components (i) and (ii) is below or equal to 100 wt. %.

Preferably, the mixture for compaction comprises
(i) 87 to 97 wt. % of a polymer stabilizer in the physical form of a powder, which is tris(2,4-ditert-butylphenyl) phosphite (CAS-No. 31570-04-4),
(ii) 3 to 13 wt. % of a processing aid in the physical form of a powder, which is a propylene-ethylene copolymer possessing a melting enthalpy below 100 J/g at 101.32 kPa, and
(iii) up to 10 wt. % of a further ingredient, which is different to component (i) and component (ii),
and the sum of components (i), (ii) and (iii) is below or equal to 100 wt. %.

Preferably, the mixture for compaction consists of
(i) 87 to 97 wt. % of a polymer stabilizer in the physical form of a powder, which is tris(2,4-ditert-butylphenyl) phosphite (CAS-No. 31570-04-4),
(ii) 3 to 13 wt. % of a processing aid in the physical form of a powder, which is a propylene-ethylene copolymer possessing a melting enthalpy below 100 J/g at 101.32 kPa, and
(iii) 0 to 10 wt. % of a further ingredient, which is different to component (i) and component (ii),
and the sum of components (i), (ii) and (iii) is 100 wt. %.

The mixture for compaction is preferably in the form of a powder.

A further embodiment of the invention is a pellet, which comprises
(i) 87 to 97 wt. % of a polymer stabilizer, which is tris(2,4-ditert-butylphenyl) phosphite (CAS-No. 31570-04-4), and
(ii) 3 to 13 wt. % of a processing aid, which is a propylene-ethylene copolymer possessing a melting enthalpy below 100 J/g at 101.32 kPa,
and wt. % is based on the weight of the pellet.

The weight percentages of the components (i) and (ii) of the pellet are based on the weight of the pellet. Accordingly, the weight percentages of all components contained in the pellet, which includes the components (i) and (ii), summarizes to overall 100 wt. %. In other words, the sum of all components is 100 wt. %. The sum of components (i) and (ii) is below or equal to 100 wt. %.

Preferably, the pellet comprises
(i) 87 to 97 wt. % of a polymer stabilizer, which is tris(2,4-ditert-butylphenyl) phosphite (CAS-No. 31570-04-4),
(ii) 3 to 13 wt. % of a processing aid, which is a propylene-ethylene copolymer possessing a melting enthalpy below 100 J/g at 101.32 kPa, and
(iii) up to 10 wt. % of a further ingredient, which is different to component (i) and component (ii),
and the sum of components (i), (ii) and (iii) is below or equal to 100 wt. %.

Preferably, the pellet consists of
(i) 87 to 97 wt. % of a polymer stabilizer, which is tris(2,4-ditert-butylphenyl) phosphite (CAS-No. 31570-04-4),
(ii) 3 to 13 wt. % of a processing aid, which is a propylene-ethylene copolymer possessing a melting enthalpy below 100 J/g at 101.32 kPa, and
(iii) 0 to 10 wt. % of a further ingredient, which is different to component (i) and component (ii),
and the sum of components (i), (ii) and (iii) is 100 wt. %.

Preferred is a pellet, which has a shape of a round rod and the round rod has a diameter of a circle, which is between 2 mm and 4 mm.

Preferred is a pellet, which has a length of 1 to 3 times of the diameter of a circle.

A further embodiment of the invention is a method for manufacturing a stabilized polymer, which comprises the steps of
(AP) dosing a pellet into a polymer to obtain a pellet-polymer mixture,
(BP) exposing the pellet-polymer mixture to a temperature in the range of 120 to 340° C. under mechanical stirring to obtain a stabilized polymer,
wherein the polymer is a polyolefin, a polystyrene or a mixture thereof,
wherein the pellet comprises
(i) 87 to 97 wt. % of a polymer stabilizer, which is tris(2,4-ditert-butylphenyl) phosphite (CAS-No. 31570-04-4), and
(ii) 3 to 13 wt. % of a processing aid, which is a propylene-ethylene copolymer possessing a melting enthalpy below 100 J/g at 101.32 kPa,
and wt. % is based on the weight of the pellet.

The weight percentages of the components (i) and (ii) of the pellet are based on the weight of the pellet. Accordingly, the weight percentages of all components contained in the pellet, which includes the components (i) and (ii), summarizes to overall 100 wt. %. In other words, the sum of all components is 100 wt. %. The sum of components (i) and (ii) is below or equal to 100 wt. %.

Preferably, at the method for manufacturing a stabilized polymer, the pellet comprises
(i) 87 to 97 wt. % of a polymer stabilizer, which is tris(2,4-ditert-butylphenyl) phosphite (CAS-No. 31570-04-4),
(ii) 3 to 13 wt. % of a processing aid, which is a propylene-ethylene copolymer possessing a melting enthalpy below 100 J/g at 101.32 kPa, and
(iii) up to 10 wt. % of a further ingredient, which is different to component (i) and component (ii),
and the sum of components (i), (ii) and (iii) is below or equal to 100 wt. %.

Preferably, at the method for manufacturing a stabilized polymer, the pellet consists of
(i) 87 to 97 wt. % of a polymer stabilizer, which is tris(2,4-ditert-butylphenyl) phosphite (CAS-No. 31570-04-4),
(ii) 3 to 13 wt. % of a processing aid, which is a propylene-ethylene copolymer possessing a melting enthalpy below 100 J/g at 101.32 kPa, and
(iii) 0 to 10 wt. % of a further ingredient, which is different to component (i) and component (ii),
and the sum of components (i), (ii) and (iii) is 100 wt. %.

At step (AP), the size of the pellet is preferably a well-fitting size, since a too large pellet is more difficult to dose, to blend and to disperse in the polymer.

At step (BP), the pellet components are homogeneously dispensed and/or dissolved in the polymer to be stabilized under mechanical stirring. This is supported by the heat exposure of the the pellet-polymer mixture, which leads to a lowering of the viscosity of the polymer on one side and a melting of pellet components on the other side, if the respective melting range of a component is reached. Preferably, the temperature at step (BP) is in the range from 135° C. to 330° C., very preferably from 150° C. to 310° C., particularly from 180° C. to 300° C., very particularly from 190° C. to 290° C., especially from 200° C. to 280° C. and very especially from 210° C. to 260° C.

A polyolefin is for example:
1. A homopolymer of mono-olefins and di-olefins, for example polypropylene, polyisobutylene, poly-but-1-ene, poly-4-methylpent-1-ene, polyvinylcyclohexane, polyisoprene or polybutadiene, as well as polymers of cycloolefins, for instance of cyclopentene or norbornene, polyethylene, for example high density polyethylene (HDPE), medium density polyethylene (MDPE), low density polyethylene (LDPE), linear low density polyethylene (LLDPE), or a mixture thereof, for example mixtures of polypropylene with polyisobutylene, polypropylene with polyethylene (for example PP/HDPE, PP/LDPE) or mixtures of different types of polyethylene (for example LDPE/HDPE).
2. A copolymer of mono-olefins or di-olefins with each other or with other vinyl monomers, for example ethylene/propylene copolymers, propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers, for example ethylene/norbornene like COC, ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidenenorbornene; and mixtures of such copolymers with one another, or mixtures with other polyolefins, for example polypropylene/ethylene-propylene copolymers, LDPE/ethylene-vinyl acetate copolymers (EVA), or LDPE/ethylene-acrylic acid copolymers (EAA).

Polyolefins of mono-olefins, preferably polyethylene and polypropylene, can be prepared by different, and especially by the following methods:
a) radical polymerisation (normally under high pressure and at elevated temperature)
b) catalytic polymerisation using a catalyst that normally contains one or more than one metal of groups 4, 5, 6 (for example chromium) or 7 of the Periodic Table. These metals usually have one or more than one ligand, typically oxides, halides, alcoholates, esters, ethers, amines, alkyls, alkenyls and/or aryls that may be either pi- or sigma-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups 1, 2 and/or 3 of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

A polystyrene is for example:
1. A homopolymer of styrene.
2. A copolymer of styrene and a co-monomer, which is for example ethylene, propylene, dienes, nitriles, acids, maleic anhydrides, maleimides, vinyl acetate, acrylic derivatives and mixtures thereof, for example styrene/butadiene, styrene/acrylonitrile, styrene/ethylene, styrene/alkyl methacrylate, styrene/butadiene/alkyl acrylate, styrene/butadiene/alkyl methacrylate, styrene/maleic anhydride, styrene/acrylonitrile/methyl acrylate, block copolymers of styrene with a co-monomer, for example styrene/butadiene/styrene, strene/isoprene/styrene, styrene/ethylene/butylene/styrene or styrene/ethylene/propylene/styrene.
3. Graft copolymers of styrene, for example styrene on polybutadiene, styrene on polybutadiene-styrene or polybutadiene-acrylonitrile copolymers, styrene and acrylonitrile on polybutadiene, styrene, acrylonitrile and methyl methacrylate on polybutadiene, styrene and maleic anhydride on polybutadiene, styrene, acrylonitrile and maleimide on polybutadiene, styrene and maleimide on polybutadiene, styrene and alkyl acrylates or methacrylates other than methyl acrylate on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers.

At a copolymer of a polyolefin, at least two different monomers are copolymerized. Preferred is a copolymer of a polyolefin, wherein the weight content of the polymerized olefinic monomer is above 50% based on the weight of all polymerized monomers. At a copolymer of a polystyrene, at least two different monomers are copolymerized or one monomer is grafted on at least a different monomer, which has been polymerized. Preferred is a copolymer of a polystyrene, wherein the weight content of polymerized or grafted styrene is above 50% based on the weight of all polymerized or grafted monomers.

Preferably, the polymer, which is a polyolefin, a polystyrene or a mixture thereof, is thermoplastic, i.e. it can be shaped into a new form at an elevated temperature, for example at a temperature in the range from 120° C. to 340° C., especially from 135° C. to 330° C.

The polymer, which is a polyolefin, a polystyrene or a mixture thereof, is susceptible to oxidative, thermal or light-induced degradation.

An amount of pellets to be dosed to the polymer, which is a polyolefin, a polystyrene or a mixture thereof, varies with the particular polymer and the desired degree of protection against oxidative, thermal or light-induced degradation. Preferably, the amount of pellets in weight percent is from 0.01 to 5 wt. % based on the weight of the polymer, very preferably from 0.02 to 3 wt. %, particularly from 0.04 to 2 wt. %, very particularly from 0.05 to 1 wt. %, especially from 0.08 to 0.8 wt. % and very especially from 0.1 to 0.4 wt. %.

Preferred is a method for manufacturing a stabilized polymer, wherein step (BP) takes place in an extruder or a co-kneader.

At step (AP), the pellet can be dosed to the polymer, which has already a polymer temperature in the range of 120 to 340° C. For example, the pellet is dosed to the polymer, which is already warmed in the extruder or co-kneader. For example, the pellet is introduced by a feeder, which is for example an extruder, into the already warm and viscous polymer to be stabilized. Accordingly, the pellet-polymer mixture has immediately the temperature of the polymer temperature in the range of 120 to 340° C. and the pellet starts to disintegrate.

Preferred is a method for manufacturing a stabilized polymer, wherein the polymer to which the pellet is dosed in step (AP) has a polymer temperature in the range of 120 to 340° C.

At step (AP), the pellet can be dosed to the polymer, which has a polymer temperature below 40° C. In case the polymer is present in the form of pellets, a pellet-polymer mixture is generated, which comprises the components (a) pellets and (b) polymer pellets. Pellets of a polymer have for example the geometric form of a cylinder and are obtained for example by hot-cutting of an extruded warm polymer strand followed by cooling in a water quench. A pellet-polymer mixture obtained in step (AP), wherein the polymer is in the form of pellets, can be prepared and stored independently from step (BP) or prepared directly before step (BP).

Preferred is a method for manufacturing a stabilized polymer, wherein the polymer to which the pellet is dosed in step (AP) is present in the form of pellets and has a polymer temperature below 40° C.

The definitions and preferences described for a method of manufacturing a stabilized polymer or applying thereto apply also to the further embodiments of the invention.

A further embodiment of the invention is a use of a pellet for a dust-free handling of its components at manufacturing of a stabilized polymer, wherein the polymer is a polyolefin, a polystyrene or a mixture thereof and wherein the pellet comprises (i) 87 to 97 wt. % of a polymer stabilizer in the physical form of a powder, which is tris(2,4-ditert-butylphenyl) phosphite (CAS-No. 31570-04-4), and (ii) 3 to 13 wt. % of a processing aid in the physical form of a powder, which is a propylene-ethylene copolymer possessing a melting enthalpy below 100 J/g at 101.32 kPa, and wt. % is based on the weight of the pellet.

The weight percentages of the components (i) and (ii) of the pellet are based on the weight of the pellet. Accordingly, the weight percentages of all components contained in the pellet, which includes the components (i) and (ii), summarizes to overall 100 wt. %. In other words, the sum of all components is 100 wt. %. The sum of components (i) and (ii) is below or equal to 100 wt. %.

Preferably, at the use of a pellet for a dust-free handling of its components at manufacturing of a stabilized polymer, the pellets comprise (i) 87 to 97 wt. % of a polymer stabilizer in the physical form of a powder, which is tris(2,4-ditert-butylphenyl) phosphite (CAS-No. 31570-04-4), (ii) 3 to 13 wt. % of a processing aid in the physical form of a powder, which is a propylene-ethylene copolymer possessing a melting enthalpy below 100 J/g at 101.32 kPa, and (iii) up to 10 wt. % of a further ingredient, which is different to component (i) and component (ii), and the sum of components (i), (ii) and (iii) is below or equal to 100 wt. %.

Preferably, at the use of a pellet for a dust-free handling of its components at manufacturing of a stabilized polymer, the pellet consists of (i) 87 to 97 wt. % of a polymer stabilizer in the physical form of a powder, which is tris(2,4-ditert-butylphenyl) phosphite (CAS-No. 31570-04-4), (ii) 3 to 13 wt. % of a processing aid in the physical form of a powder, which is a propylene-ethylene copolymer possessing a melting enthalpy below 100 J/g at 101.32 kPa, and (iii) 0 to 10 wt. % of a further ingredient, which is different to component (i) and component (ii), and the sum of components (i), (ii) and (iii) is 100 wt. %.

Figure 1:
FIG. 1 shows pellets obtained from example E-1-1, which are placed on a millimeter paper.

The following examples illustrate further the invention without limiting it. Percentage values are percentage by weight if not stated differently.

A) Methods for Characterization

Mean particle size is determined, if not otherwise stated, by a Camsizer P4 from the Company Retsch Technology GmbH via digital image analysis. The measuring principle is dynamic image analysis according to ISO 13322-2.

Bulk density is measured complying to DIN EN ISO 17892-3.

Melt flow index of a polymer is measured according to ISO 1133 on a Goettfert MI-Robo with the specifically stated parameters.

Differential scanning calorimetry (DSC) is measured according to EN ISO 11357-3 at atmospheric pressure. Heating cycles are (a) 0° C. to 200° C. at 10° C./min and 30 mL/min $N_2$, (b) 200° C. to 0° C. at 10° C./min and 30 mL/min $N_2$, (C) 0° C. to 200° C. at 10° C./min and 30 mL/min $N_2$. Melting range, melting peak temperature and melting enthalpy are determined at heating cycle (c).

High temperature gel permeation chromatography (HT-GPC) is measured according to ISO 16014-4. As an apparatus, an Agilent PL-GPC 220 with RI detector is used. As a precolumn, one Agilent PFgel Olexis Guard 50×7.5 mm column (part No. PL1110-1400) is used. As columns, three Agilent PLgel Olexis 13 μm 300×7.5 mm columns (part No. PL1110-6400) are used. The column temperature is 150° C. The calibration standards are polystyrene and High EasiVial GPC/SEC calibration standards from Agilent (part No. PL2010-0201 and part No. PL2010-0202). Trichlorobenzene is used as the eluent with a flow rate of 1 mL/min, a sample concentration of 3 mg/mL and an injection volume of 200 μL. A determined number average molecular weight Mn and a determined weight average molecular weight Mw are used to calculate a polydispersity index (PD) as the ratio between Mw and Mn.

Sieve analysis is conducted by a Camsizer P4 from the company Retsch Technology GmbH via digital image analysis. The measuring principle is dynamic image analysis according to ISO 13322-2) with D10, D50 and D90 values.

The Norner attrition test is a test using a vibrating sieve shaker and glass beads to mechanically treat the tested form. An initial sieve analysis is conducted for 1 minute followed by further sieving using glass balls on the sieve decks to mechanically impact the material and measure the change of the sieve fractions after 5, 10 and 20 minutes. Sieves selected are bottom up: 200 μm, 500 μm, 1 mm, 1.6 mm, 2.5 mm and 4 mm. The used glass balls (company Sigmund Lindner GmbH, type P) are of 16 mm ±0.02 mm, weight 5.36 g/glass ball and made of soda lime glass with fine matt surface.

The test procedure is as follow:
1. The sieve shaker without glass beads is charged with 50 g of a sample and the sieving with amplitude 1 mm is conducted for 1 minute. Measuring of mass on each sieve tray and sieve pan.
2. Add 8 glass balls on sieve 500 μm; 9 glass balls on sieve 1.0 mm, 10 on sieve 1.6 mm and 11 on sieve 2.5 mm. Proceed sieving for 5 minutes then measure mass on each sieve tray and sieve pan.
3. Proceed sieving for another 5 minutes, repeat weighing procedure.
4. Proceed sieving for another 10 minutes, repeat weighing procedure.

A Retsch Sieve Shaker AS 200 control from the company Retsch GmbH is used as sieve shaker.

Total fines are the sum of all material, which is collected from bottom plate and 200 μm mesh sieve. Accordingly, the fragments of a sample, which are generated under attrition stress and fall through a 500 μm mesh sieve (<500 μm), are considered fines. The particle size fraction in wt. % <500 μm after 20 minutes is the key result (Norner value) to determine abrasion and impact resistance of the tested form. The range of results can vary from 0% for extremely stable to 100% for extremely unstable.

An average weight of pellets is measured by taking a certain number of pellets (around 45 pellets), weighing the certain number of pellets to obtain an overall weight and dividing the overall weight by the certain number of the pellets.

An average length of the pellets is calculated by multiplying the average weight of pellets with an assumed density of 0.95 g/cm³ and dividing by the circular area of a circle with a pellet diameter of 3 mm.

B) Starting Material

SM-PS-1: Irgafos 168

Irgafos 168 (TM, commercially available from BASF SE, melting point between 180-183° C.), which contains tris(2,4-ditert-butylphenyl) phosphite (CAS-No. 31570-04-4) as depicted below

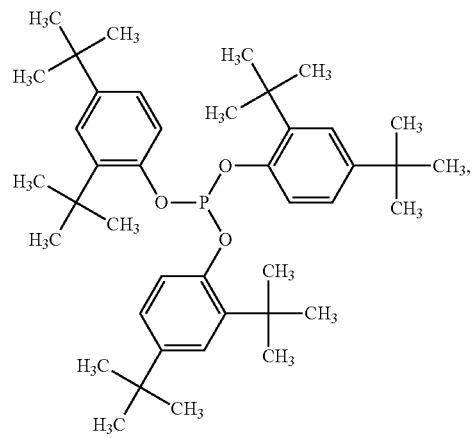 [SMILES: CC(C)(C)c1ccc(OP(Oc2ccc(C(C)(C)C)cc2C(C)(C)C)Oc2ccc(C(C)(C)C)cc2C(C)(C)C)c(C(C)(C)C)c1]

in the form of a powder, i.e. a loose bulk material with a bulk density of 467 g/L and a mean particle size of 400 μm.

SM-PA-1: Licocene PP 1302

Licocene PP 1302 (TM, commercially available from Clariant, employed commercial technical form: fine grain) is a propylene-ethylene copolymer wax (CAS-No. 9010-79-1), which is synthesized with a metallocene catalyst from propylene and ethylene. Branching of the long polymeric chains occurs by short chains ($-CH_3$). Some physical-chemical properties are measured and depicted in table B-1.

Technical data sheet states a density at 23° C. according to ISO 1183 of 0.87 g/cm₃.

Technical data sheet states a drop point according to ASTM D 3954 of 87-93° C.

Technical data sheet states a viscosity at 170° C. according to DIN 53019 of 150-250 mPas.

Sieve analysis of the material in the technical form fine grain is measured and depicted in table B-2. A bulk density of 338 g/L is measured. The material in its technical form fine grain is employed for compaction.

SM-PA-2: Petrolite EP-700

Petrolite EP-700 (TM, commercially available from Baker Hughes) is a propylene-ethylene copolymer wax (CAS-No. 9010-79-1). Controlled branching of the long polymeric chains occurs by short chains from propylene ($-CH_3$). Some physical-chemical properties are measured and depicted in table B-1.

Technical data sheet states a drop melting point according to ASTM D-127 of 96° C.

Technical data sheet states a viscosity at 99° C. of 12 pcs (120 mPas).

Petrolite EP-700 is milled in a disc mill PF 300 from Pallmann. Sieve analysis of the obtained ground material is measured and depicted in table B-2. A bulk density of the ground material of 473 g/L is measured. The ground material is employed for compaction.

SM-PA-3: Luwax AL-3

Luwax AL-3 (TM, commercially available from BASF as a powder) is a polyethylene wax (CAS-No. 9002-88-4), which is synthesized by a high-pressure polymerization. Branching of the long polymeric chains occurs by long chains ($-[CH_2-CH_2-]_n-H$). Some physical-chemical properties are measured and depicted in table B-1.

Technical data sheet states a density at 23° C. according to DIN 53479 and ASTM D-792 of 0.91-0.925 g/cm₃.

Technical data sheet states a drop point (Ubbelohde) according to DIN 51801 and ASTM D-3954 of 101-112° C.

Technical data sheet states a melting point (DSC) according to DIN 51007 and ASTM D-3418 of 102-108° C.

Technical data sheet states a melt viscosity at 120° C. according to DIN 51562 and ASTM D2162 of 135-240 $mm^2/s$.

Sieve analysis of the material in the technical form powder is measured and depicted in table B-2. A bulk density of 495 g/L is measured. The material in its technical form is employed for compaction.

SM-PA-4: Dow PG 7008

Dow PG 7008 (TM, commercially available from Dow Chemicals) is a low density polyethylene (CAS-No. 9002-88-4). Some physical-chemical properties are measured and depicted in table B-1.

Technical data sheet states a density at 23° C. according to ASTM D-792 of 0.918 g/cm₃.

Technical data sheet states a melting temperature (DSC) of 106° C.

Technical data sheet states a vicat softening temperature according to ISO 306/A of 89.0° C.

Technical data sheet states a melt index (190° C./2.16 kg) according to ISO 1133 of 7.7 g/10 min.

Dow PG 7008 is milled in a disc mill PF 300 from Pallmann. Sieve analysis of the obtained ground material is measured and depicted in table B-2. A bulk density of the ground material of 285 g/L is measured. The ground material is employed for compaction.

SM-PA-5: Borflow HL 708 FB

Borflow HL 708 FB (TM, commercially available from Borealis) is a polypropylene (CAS-No. 9003-07-0). Some physical-chemical properties are measured and depicted in table B-1.

Technical data sheet states a melting temperature (DSC) of 158° C. Technical data sheet states a melt index (130° C./2.16 kg) according to ISO 1133 of 800 g/10 min.

Borflow HL 708 FB is milled in a disc mill PF 300 from Pallmann. Sieve analysis of the obtained ground material is measured and depicted in table B-2. A bulk density of the ground material of 365 g/L is measured. The ground material is employed for compaction.

TABLE B-2

| | sieve analysis | | |
|---|---|---|---|
| starting material | Q3 10% [mm] | Q3 50% [mm] | Q3 90% [mm] |
| SM-PA-1 | 0.414 | 0.836 | 1.583 |
| SM-PA-2 (ground) | 0.324 | 0.710 | 1.538 |
| SM-PA-3 | 0.302 | 0.740 | 1.521 |
| SM-PA-4 (ground) | 0.225 | 0.484 | 1.091 |
| SM-PA-5 (ground) | 0.359 | 0.716 | 1.145 |

C) Preparation of Mixtures for Compaction

Mixtures for compaction consisting of a polymer stabilizer and a processing aid are prepared by blending the starting materials as depicted in table C-1 in a 100-L MTI blender for 5 minutes at room temperature.

TABLE C-1

| | mixtures for compaction | | | | |
|---|---|---|---|---|---|
| mixture-No. | polymer stabilizer | amount [%] | processing aid | amount [%] | physical form [c] |
| C-M-1 [a] | SM-PS-1 | 92 | SM-PA-1 | 8 | powder |
| C-M-2 [a] | SM-PS-1 | 95 | SM-PA-1 | 5 | powder |
| C-M-3 [b] | SM-PS-1 | 92 | SM-PA-2 | 8 | powder |
| C-M-4 [b] | SM-PS-1 | 92 | SM-PA-3 | 8 | powder |
| C-M-5 [b] | SM-PS-1 | 92 | SM-PA-4 | 8 | powder |
| C-M-6 [b] | SM-PS-1 | 92 | SM-PA-5 | 8 | powder |

Food notes:
[a] inventive
[b] comparative
[c] at room temperature and atmospheric pressure D) Flakes by Roll Compaction For example D-1-1, starting material SM-PS-1 (100%) is press-agglomerated via a roll compaction process to obtain flakes for comparison. SM-PS-1 in powder form in a hopper is force-fed via a feeding screw into a compaction zone. The compaction zone is formed by a remaining gap between two rolls with slightly scratched surfaces, which are rotating towards each other. The rolls are cooled with cold water to keep the temperature close to room temperature. A suitable laboratory roll compactor is for example model WP 50N/75 (roll diameter: 150 mm, roll length: 75 mm, maximum press capacity: 12.8 t, maximum linear load: 1.71 t/cm) from the

TABLE B-1

| | | measured physical-chemical properties of starting materials processing aids | | | | | |
|---|---|---|---|---|---|---|---|
| | | DSC measurement | | | HT-GPC measurement | | |
| starting material | commercial name | melting range [° C.] | melting peak temperature [° C.] | melting enthalpy [J/g] | Mn [Da] | Mw [Da] | PD |
| SM-PA-1 | Licocene PP 1302 | 24-95 | 76 | 23 | 6833 | 17285 | 2.53 |
| SM-PA-2 | Petrolite EP-700 | 27-104 | 88 | 218 | 1335 | 1532 | 1.15 |
| SM-PA-3 | Luwax AL-3 | 24-112 | 105 | 127 | 3128 | 7613 | 2.43 |
| SM-PA-4 | Dow PG 7008 | 25-116 | 106 | 117 | 30176 | 367733 | 12.2 |
| SM-PA-5 | Borflow HL 708 FB | 120-173 | 157 | 109 | 25132 | 189565 | 7.54 | company Alexanderwerk GmbH in Germany. The compacted starting material, which leaves the compaction zone as plates, is granulated via a sieve granulator with a 1.6 mm sieve, for example model GLA-ORV-0215 from company Frewitt Ltd from Switzerland is suitable, to create free flowing flakes (=flakes of D-1-1). A Norner attrition test is conducted for the flakes of D-1-1 and the result is depicted in table E-1.

E) Pellets by a Compaction with a Ring-Die Pellet Mill

Figure 2:
FIG. 2 shows pellets obtained from example E-1-2, which are placed on a millimeter paper.
Figure 3:
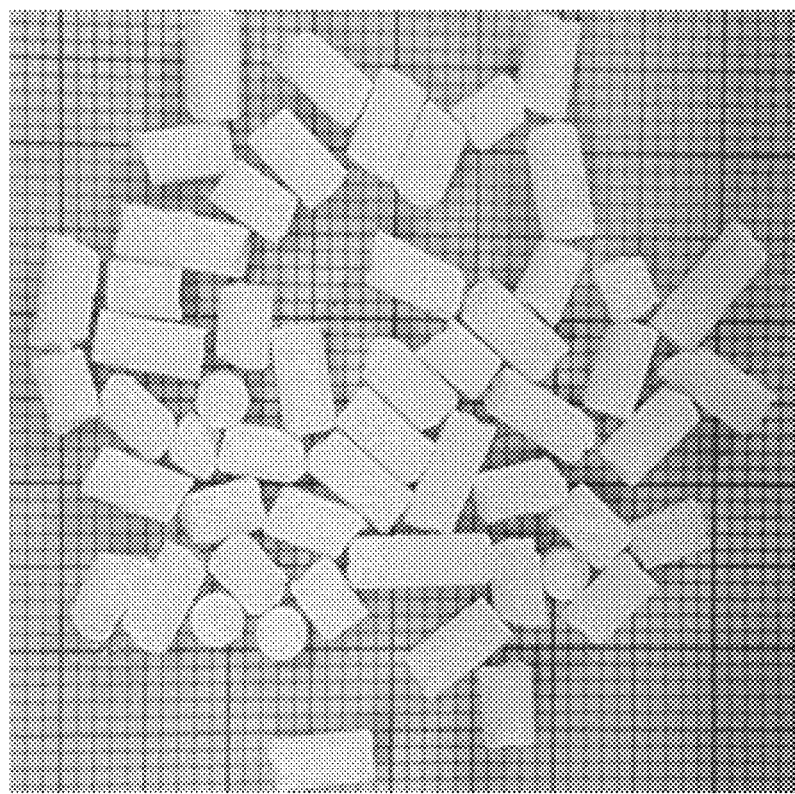
FIG. 3 shows pellets obtained from example E-1-3, which are placed on a millimeter paper.
Figure 4:
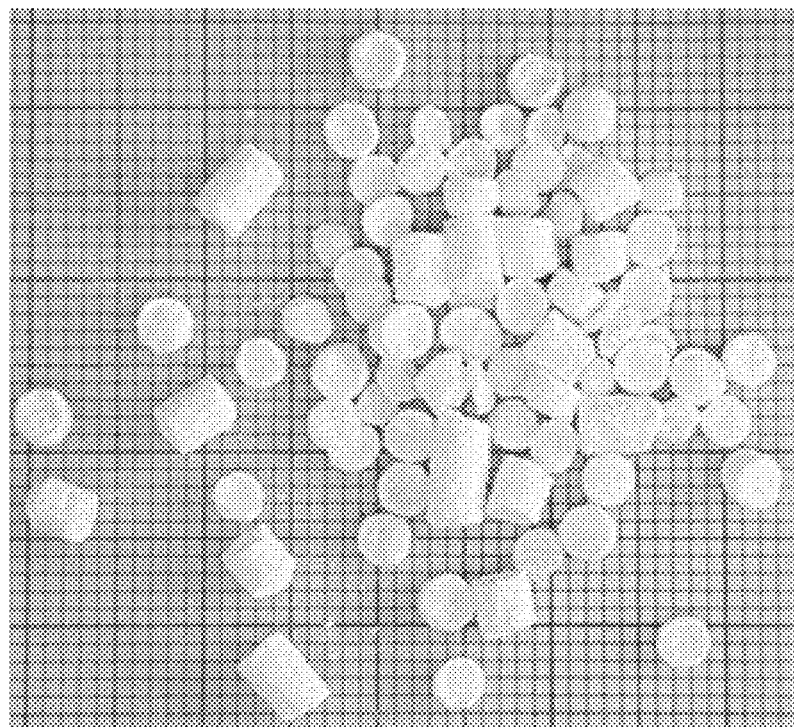
FIG. 4 shows pellets obtained from example E-1-4, which are placed on a millimeter paper.
Figure 5:
FIG. 5 shows pellets obtained from example E-1-5, which are placed on a millimeter paper.
Figure 6:
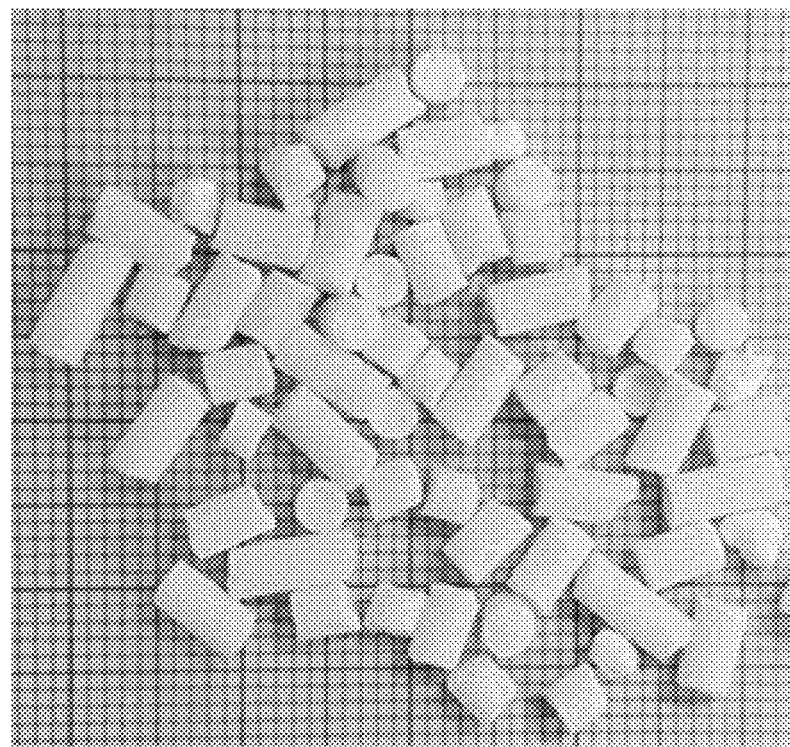
FIG. 6 shows pellets obtained from example E-1-6, which are placed on a millimeter paper.
Figure 7:
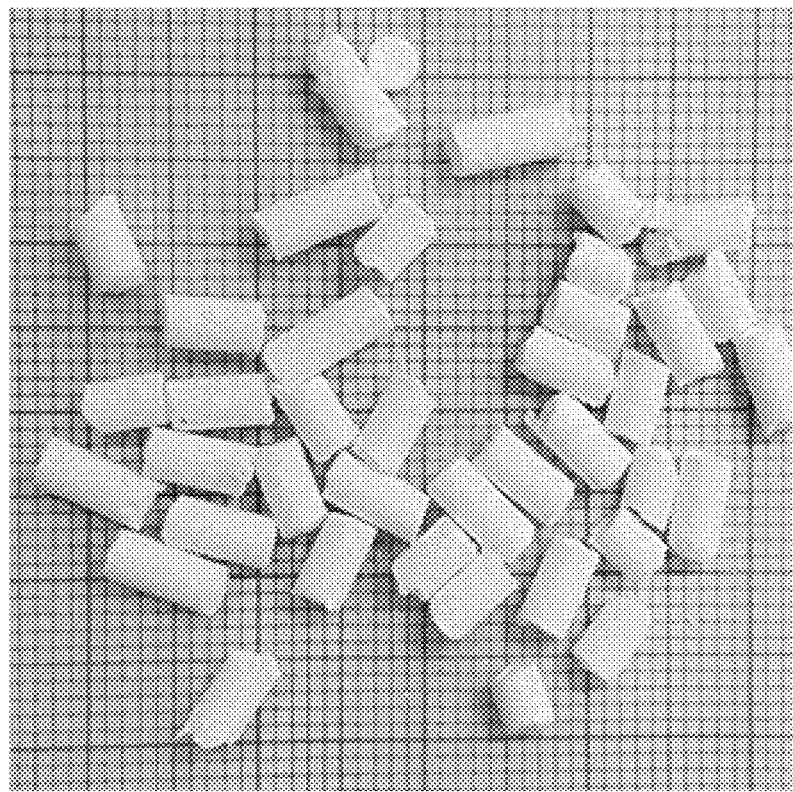
FIG. 7 shows pellets obtained from example E-1-7, which are placed on a millimeter paper.
Figure 8:
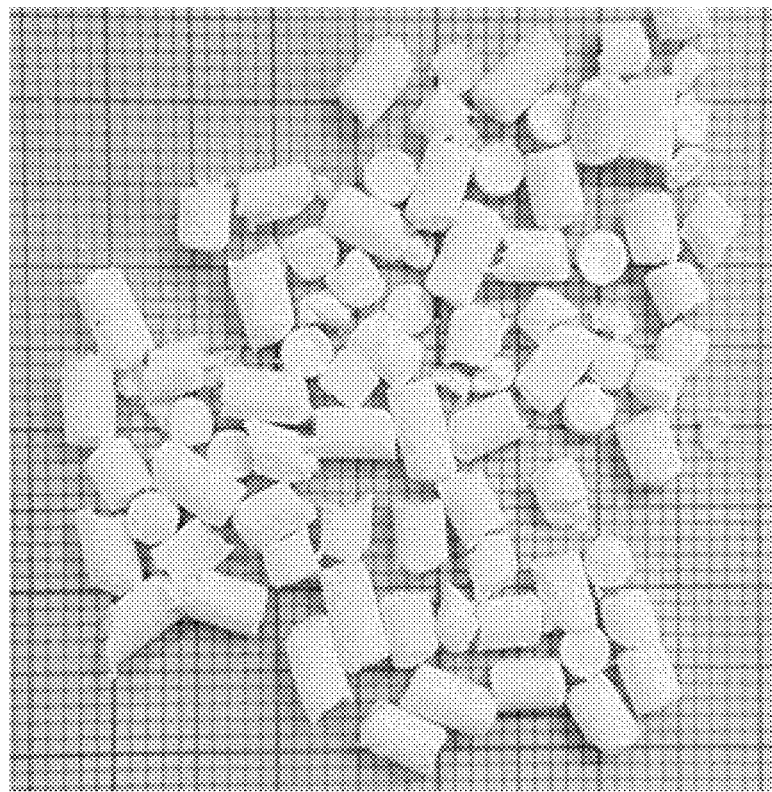
FIG. 8 shows pellets obtained from example E-1-8, which are placed on a millimeter paper.

A ring-die pellet mill, i.e. a Muench Pelletizer RMP 250, is used for compaction trials of materials as stated in table E-1. A Muench ring-die pellet mill is depicted for example in the article "Produktgestaltung über mechanisches Agglomerieren von Pulvern", W. Raehse, Chemie Ingeneur Technik, 2015, 87, No.7, 881-902 at picture 18 on p. 898. The Muench Pelletizer RMP 250 possesses a rotatable ring die, which is equipped with nozzles, e.g. nozzles with a nozzle diameter of 3 mm and a press length of 15 mm or 18 mm. The inner diameter of the ring die is 250 mm and its width is around 4 cm. A row with two or three nozzles fits to this width. The nozzles expand with an angle of 60° to the inner side of the ring die. The nozzle diameter is defined herein as the smallest diameter of the cylindric channel of the nozzle and press length is a distance, where the smallest diameter applies. The cylindric channel of the nozzle might expand after the press length, but the expanded part of the cylindric channel does not contribute for building up friction by the material to be compacted. Here, the channels of the nozzles are not expanded. The specifically applied nozzle diameter and press lengths are stated in table E-1. The material for compaction is dosed at room temperature by a volumetric single screw feeder, which is placed above the pellet press section of the ring-die pellet mill, by gravimetry into the pellet press section, which comprises the die with its nozzles and two rollers. The rollers, each with a diameter of 96 mm and a width of 30 mm, have a corrugated surface. In the pellet press section, the two rollers push the material into the nozzles of the rotating ring-die, where the material is compacted and heated up by shear forces to a temperature, at which the processing aid starts to soften and in a sintering process the compacted material is granulated to cylindrical pellets. For beginning the process, the rotation of the ring die is set to a circumferential velocity of around 4 m/s at the inner surface of the ring die, i.e. at a distance of 12.5 cm from an axis of rotation of the ring die. The material for compaction is fed as a powder into the press section. An initial starting phase of around 15 minutes is necessary until a stable running of the process is achieved. While initially a powder of the material for compaction is flowing through the nozzles, this changes towards formation of a strand at some materials for compaction and the ring die, the rollers and the nozzles are reaching a stable temperature. A temperature, which would be too high for a material for compaction, can result in a generation of a pasty mass, which blocks a further feeding of the material for compaction. At the outlet of the nozzle, the strand is cut/broken by two knifes with an adjustable distance to the ring die to pellets with a length of around 1 to 3 times of the diameters of the pellets, i.e. around 3 mm to 9 mm. Ideally, the variation in length is minimal but a certain variation cannot be avoided due to the cutting/breaking. Table E-1 states whether pellets are obtained and thus also whether a strand forms. Once the process is running stable, the temperature of the material exiting the nozzles in the die is measured by an IR-temperature sensor through measuring contactlessly the emitted IR irradiation and stated in table E-1 as surface temperature of the strand. Statistically, the emitted IR irradiation of the outer surface of the ring is also included. However at a process running stable, the ring die has warmed up close to the surface temperature of the strand. The ring die itself is not heated (with the exception of example E-1-4) or cooled but experiences a warming due to the occurring friction of the material for compaction. The obtained pellets are sieved with a 1.6 mm sieve (200 mm diameter vibrating lab sieve) to separate fines from the obtained pellets. The amount of fines removed by sieving based on the overall amount of material for compaction is stated in table E-1. The removed fines can be directly reused as material to be compacted. The pellets have cooled down to room temperature. If pellets are obtained, a Norner attrition test of the pellets after sieving is conducted and results are depicted in table E-1. Further characterizations of the obtained pellets are depicted in table E-2. Pictures of the pellets obtained at examples E-1-1 to E-1-8 are depicted at FIG. 1 to FIG. 8.

TABLE E-1 ring-die pellet mill compactions and attrition test results

| example No. | material for compaction | composition [%] | nozzle size [d] [mm] | surface temperature of the strand [° C.] | pellets | removed fines [%] | Norner test [%] |
|---|---|---|---|---|---|---|---|
| E-1-1 [a] | C-M-2 | SM-PS-1 (95) SM-PA-1 (5) | 3 × 18 | 96 | yes | 12.0 | 46 |
| E-1-2 [a] | C-M-1 | SM-PS-1 (92) SM-PA-1 (8) | 3 × 18 | 99 | yes | 11.5 | 21 |
| E-1-3 [a] | C-M-1 | SM-PS-1 (92) SM-PA-1 (8) | 3 × 15 | 63 | yes | 6.6 | 9 |
| E-1-4 [b] | SM-PS-1 | SM-PS-1 (100) | 3 × 15 | 74 | yes [e] | 20 | 96 |
| E-1-5 [b] | C-M-3 | SM-PS-1 (92) SM-PA-2 (8) | 3 × 15 | 77 | yes | 8.8 | 97 |
| E-1-6 [b] | C-M-4 | SM-PS-1 (92) SM-PA-3 (8) | 3 × 15 | 82 | yes | 18.0 | 68 |

TABLE E-1-continued ring-die pellet mill compactions and attrition test results

| example No. | material for com- paction | composition [%] | nozzle size [d] [mm] | surface temper- ature of the strand [° C.] | pellets | removed fines [%] | Norner test [%] |
|---|---|---|---|---|---|---|---|
| E-1-7 [b] | C-M-5 | SM-PS-1 (92) SM-PA-4 (8) | 3 × 15 | 83 | yes | 45.0 | 80 |
| E-1-8 [b] | C-M-6 | SM-PS-1 (92) SM-PA-5 (8) | 3 × 15 | 95 | yes | 12.0 | 89 |
| D-1-1 [b),c] | SM-PS-1 | SM-PS-1 (100) | roll com- paction | close to room temper- ature | flakes | — | 98 |

Food notes:
[a] inventive
[b] comparative
[c] example of a roll compaction as described at D)
[d] nozzle diameter × press length
[e] in deviation from the general procedure, the nozzles and the ring are initially pre-heated to 120° C. before the initial starting phase to reduce the starting phase time - however, the process runs unstable with a lower throughput than at the other examples E-1-1 to E-1-8

From the results of the table E-1:
example D-1-1 shows that SM-PS-1 (Irgafos 168) can be cold-compacted to flakes, but the Norner attrition test results of the flakes are poor;
example E-1-4 shows that SM-PS-1 (Irgafos 168) without a processing aid requires for pelletization in a ring-die pellet mill a special pre-heating/it is concluded that SM-PS-1 itself has a too high melting point and requires a processing aid as a binder to allow a forma- tion of stable pellets;
example E-1-2 versus example E-1-3 shows that a higher die length leads by more friction to a higher process temperatue, which however does not lead to a better Norner attrition test result;
example E-1-3 versus example E-1-4 shows that SM- PA-1 (Licocene 1302) leads to pellets with a signifi- cantly better Norner attrition test result than without a processing aid;
example E-1-2 versus example E-1-5 shows than SM- PA-1 (Licocene 1302) leads to pellets with a signifi- cantly better Norner attrition test result than SM-PA-2 (Petrolite EP-700) despite of both processing aids being a propylene-ethylene copolymer wax;
example E-1-5 and E-1-8 show that the amount of fines, which are generated at the process itself and removed by the 1.6 mm sieve, is not a reliable indicator for a beneficial Norner attrition test result.

TABLE E-2 pellet characterization

| example No. | material for com- paction | composition [%] | pellet diameter [c] [mm] | average pellet length [d] [mm] | average pellet weight [mg] | picture at FIG. | Norner test [e] [%] |
|---|---|---|---|---|---|---|---|
| E-1-1 [a] | C-M-2 | SM-PS-1 (95) SM-PA-1 (5) | 3 | 3.7 | 25.1 | 1 | 46 |
| E-1-2 [a] | C-M-1 | SM-PS-1 (92) SM-PA-1 (8) | 3 | 4.0 | 26.8 | 2 | 21 |
| E-1-3 [a] | C-M-1 | SM-PS-1 (92) SM-PA-1 (8) | 3 | 5.1 | 33.9 | 3 | 9 |
| E-1-4 [b] | SM-PS-1 | SM-PS-1 (100) | 3 | 1.3 | 8.6 | 4 | 96 |
| E-1-5 [b] | C-M-3 | SM-PS-1 (92) SM-PA-2 (8) | 3 | 3.7 | 25.1 | 5 | 97 |
| E-1-6 [b] | C-M-4 | SM-PS-1 (92) SM-PA-3 (8) | 3 | 3.9 | 26.0 | 6 | 68 |
| E-1-7 [b] | C-M-5 | SM-PS-1 (92) SM-PA-4 (8) | 3 | 4.9 | 33.0 | 7 | 80 |
| E-1-8 [b] | C-M-6 | SM-PS-1 (92) SM-PA-5 (8) | 3 | 3.1 | 20.5 | 8 | 89 |

Food notes:
[a] inventive
[b] comparative
[c] caused by the diameter of the nozzles
[d] calculated from average pellet weight
[e] results from table E-1 depicted again From the results of the table E-2:
example E-1-4 shows that SM-PS-1 without a processing aid leads only to pellets with a low average weight;
example E-1-7 shows that a high average weight is not a reliable indicator for a beneficial Norner attrition test result;
the obtained pellets look at the pictures rather similar with the exception of the pellets obtained at example E-1-4 and are not a reliable indicator for a beneficial Norner attrition test result.

What is claimed is:

1. A method for manufacturing a pellet in a pellet mill, the pellet mill comprising a roller and a die with a nozzle, the method comprising:
   (A) pressing a mixture for compaction by the roller through the nozzle to obtain a strand, and
   (B) comminuting the strand to obtain the pellet,
   wherein the mixture for compaction comprises
      (i) 87 to 97 wt. % of a polymer stabilizer, which is tris(2,4-ditert-butylphenyl) phosphite, and
      (ii) 3 to 13 wt. % of a processing aid, which is a propylene-ethylene copolymer and which possesses a melting enthalpy below 100 J/g at 101.32 kPa,
   and wherein the wt. % is based on the weight of the mixture for compaction.

2. The method according to claim 1, wherein the melting enthalpy is determined by a differential scanning calorimetry according to EN ISO 11357-3.

3. The method according to claim 1, wherein the processing aid possesses a weight average molecular weight above 10000 Da and below 40000 Da.

4. The method according to claim 1, wherein the processing aid possesses a melting peak temperature above 50° C. and below 85° C.

5. The method according to claim 4, wherein the melting peak temperature is determined by a differential scanning calorimetry according to EN ISO 11357-3.

6. The method according to claim 1, wherein the processing aid is a propylene-ethylene copolymer, which is a wax.

7. The method according to claim 1, wherein the mixture for compaction comprises (i) 89 to 96 wt. % of the polymer stabilizer, (ii) 4 to 11 wt. % of the processing aid.

8. The method according to claim 1, wherein the strand has a surface temperature above 50° C. and below 110° C.

9. The method according to claim 1, wherein the method comprises a step (pre-A) feeding the mixture for compaction into the pellet mill, wherein the mixture for compaction is in the form of a powder, and the step (pre-A) occurs before the step (A).

10. The method according to claim 1, wherein the pellet mill is a ring die pellet mill, wherein the die has a geometric form of a ring with an inner side and an outer side and the nozzle represent a pass from the inner side to the outer side, or the pellet mill is a flat die pellet mill, wherein the die has a geometric form of a planar plate with an upper side and a lower side and the nozzle represents a pass from the upper side to the lower side.

11. The method according to claim 10, wherein at the ring die pellet mill, the ring is rotating and the roller possesses a rotation axis, which is stationary, and at the flat die pellet mill, the die is stationary and the roller possesses a rotation axis, which is rotating.

12. The method according to claim 1, wherein the nozzle has a nozzle diameter and a press length, and a ratio of the press length to the nozzle diameter is from 2 to 8.

13. The method according to claim 1, wherein the roller surface is corrugated.

14. The method according to claim 1, wherein the pellet mill is a ring die pellet mill.

15. The method according to claim 1, wherein the pellet mill comprises two or more rollers and the die comprises two or more nozzles.

16. A pellet, comprising:
   (i) 87 to 97 wt. % of a polymer stabilizer, which is tris(2,4-ditert-butylphenyl) phosphite (CAS-No. 31570-04-4), and
   (ii) 3 to 13 wt. % of a processing aid, which is a propylene-ethylene copolymer possessing a melting enthalpy below 100 J/g at 101.32 kPa,
   and wherein the wt. % is based on the weight of the pellet.

17. The pellet according to claim 16, which has a shape of a round rod and the round rod has a diameter of a circle, which is between 2 mm and 4 mm.

18. The pellet according to claim 17, which has a length of 1 to 3 times of the diameter of the circle.

19. A method of using a pellet according to claim 16 for a dust-free handling of its components at manufacturing of a stabilized polymer, wherein the polymer is a polyolefin, a polystyrene or a mixture thereof.

20. A method for manufacturing of a stabilized polymer, which comprises the steps of
   (AP) dosing a pellet according to claim 16 into a polymer to obtain a pellet-polymer mixture,
   (BP) exposing the pellet-polymer mixture to a temperature in the range of 120 to 340° C. under mechanical stirring to obtain a stabilized polymer,
   wherein the polymer is a polyolefin, a polystyrene or a mixture thereof.

21. A mixture for compaction, comprising:
   (i) 87 to 97 wt. % of a polymer stabilizer in the physical form of a powder, which is tris(2,4-ditert-butylphenyl) phosphite, and
   (ii) 3 to 13 wt. % of a processing aid in the physical form of a powder, which is a propylene-ethylene copolymer possessing a melting enthalpy below 100 J/g at 101.32 kPa,
   and wherein the wt. % is based on the weight of the mixture for compaction.

* * * * *